United States Patent
Sodagar

(10) Patent No.: US 12,401,727 B2
(45) Date of Patent: Aug. 26, 2025

(54) EDGE APPLICATION SERVER DISCOVERY AND IDENTIFICATION OF ACTIVATED EDGE APPLICATION SERVERS AND ASSOCIATED PROFILES

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 133 days.

(21) Appl. No.: 18/127,996

(22) Filed: Mar. 29, 2023

(65) Prior Publication Data

US 2023/0353643 A1 Nov. 2, 2023

Related U.S. Application Data

(60) Provisional application No. 63/325,508, filed on Mar. 30, 2022, provisional application No. 63/325,512, filed on Mar. 30, 2022.

(51) Int. Cl.
*H04L 67/51* (2022.01)
*H04L 45/02* (2022.01)
*H04L 65/60* (2022.01)

(52) U.S. Cl.
CPC .............. *H04L 67/51* (2022.05); *H04L 45/02* (2013.01); *H04L 65/60* (2013.01)

(58) Field of Classification Search
CPC .......... H04L 45/02; H04L 65/60; H04L 67/51
See application file for complete search history.

(56) References Cited

U.S. PATENT DOCUMENTS

| | | | | |
|---|---|---|---|---|
| 11,463,519 | B2 * | 10/2022 | Gupta | H04L 67/1095 |
| 11,997,590 | B2 * | 5/2024 | Kim | H04W 48/16 |
| 12,010,159 | B2 * | 6/2024 | Sodagar | H04L 65/1016 |
| 12,088,459 | B2 * | 9/2024 | Gautam | H04L 41/5041 |

(Continued)

FOREIGN PATENT DOCUMENTS

WO WO 2022/019676 A1 1/2022

OTHER PUBLICATIONS

3GPP TS 23.558 v17.3.0 (Mar. 2022) 3rd Generation Partnership Project; Technical Specification Group Services and System Aspects; Architecture for enabling Edge Applications; (Release 17) (166 pages).

(Continued)

*Primary Examiner* — G. C. Neurauter, Jr.
(74) *Attorney, Agent, or Firm* — Crowell & Moring LLP

(57) ABSTRACT

This disclosure relates to an edge-enabled Fifth Generation Media Streaming (5GMS) system that includes a user device that transmits an edge application server (EAS) discovery request including at least one of: a service key performance indicator, a service area, a service availability schedule, or a service continuity scenario. An edge data network responds to the discovery request by identifying one or more available EASs that satisfy the discovery request. The disclosure also relates to a 5GMS application provider that communicates with a 5GMS application function (AF) and/or an edge enabler server (EES) to obtain a list of activated EASs and/or EAS profiles of the activated EASs. The 5GMS application provider may use different interfaces to obtain the list and the EAS profiles.

7 Claims, 6 Drawing Sheets

(56) References Cited

U.S. PATENT DOCUMENTS

| | | | |
|---|---|---|---|
| 2016/0050120 A1 | 2/2016 | Liu et al. | |
| 2020/0404069 A1 | 12/2020 | Li et al. | |
| 2021/0352113 A1 | 11/2021 | Sodagar | |
| 2022/0240061 A1 | 7/2022 | Sodagar | |
| 2022/0377389 A1 | 11/2022 | Sodagar | |
| 2022/0417813 A1* | 12/2022 | Kolan | H04W 36/0033 |
| 2023/0176915 A1* | 6/2023 | Rhyu | G06T 19/006 |
| | | | 718/104 |
| 2023/0269158 A1* | 8/2023 | Gautam | H04L 43/065 |
| | | | 370/252 |
| 2023/0284129 A1* | 9/2023 | Zaus | H04W 24/10 |
| | | | 455/435.2 |
| 2024/0107424 A1* | 3/2024 | Takakura | H04W 28/0289 |
| 2024/0121740 A1* | 4/2024 | Takakura | H04W 60/00 |
| 2024/0396795 A1* | 11/2024 | Bouazizi | H04L 67/51 |
| 2024/0396847 A1* | 11/2024 | Hu | H04L 47/245 |
| 2024/0430781 A1* | 12/2024 | Roy | H04L 67/1038 |
| 2025/0023954 A1* | 1/2025 | Xu | H04L 67/51 |

OTHER PUBLICATIONS

3GPP TS 26.501 v17.0.1 (Jan. 2022) 3rd Generation Partnership Project; Technical Specification Group Services and System Aspects; 5G Media Streaming (5GMS);General description and architecture (Release 17) (87 pages).

Office Action issued in Japanese Patent Application No. 2023-565270 dated Sep. 24, 2024, with English translation, 12 pages.

Qualcomm Incorporate "dCR on Edge Configuration over M5 for Media Service" 3GPP TSG SA WG4 #117-e, S4-220293, Feb. 8, 2022, 7 pages.

SA WG4, "Presentation of TR26.803, Version 2.0.0, titled Multicast Architecture Enhancement for SG Media Streaming" 3GPP TSG SA#92-e, SP-210380, Jun. 9, 2021, 28 pages.

International Search Report and Written Opinion in International Patent Application No. PCT/US23/65134 dated Jul. 31, 2023, 10 pages.

* cited by examiner

EDGE APPLICATION SERVER DISCOVERY AND IDENTIFICATION OF ACTIVATED EDGE APPLICATION SERVERS AND ASSOCIATED PROFILES

INCORPORATION BY REFERENCE

This application is based on and claims the benefit of priority to U.S. Provisional Application No. 63/325,508, filed on Mar. 30, 2022, and to U.S. Provisional Application No. 63/325,512, filed Mar. 30, 2022, the contents of each of which are herein incorporated by reference in their entirety.

TECHNICAL FIELD

This application generally relates to Fifth Generation Media Streaming (5GMS) using edge processing, and more particularly to edge application server (EAS) discovery, and identification of activated EASs and associated EAS profiles.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Utilizing edge processing for 5GMS architecture may be desirable due to the advantages that edge processing provides, such as with respect to latency, response time, bandwidth, and proximity of the processing closer to the user equipment (UE). Accordingly, ways to provision edge services by the client and/or to obtain information about edge application servers may be desirable.

SUMMARY

Aspects of the disclosure provide methods and apparatuses for media streaming and edge resource processing for Fifth Generation Media Streaming (5GMS) applications.

In some implementations, a method of media streaming includes: determining, by a user device, to determine a target edge application server (EAS) for a Fifth Generation Media Streaming (5GMS) streaming session with a 5GMS-aware application of the user device; sending, by the user device, a discovery request to identify one or more available EASs for the streaming session, wherein the discovery request comprises one or more discovery filters, the one or more discovery filters comprising one or more of: a service key performance indicator (KPI), a service area, a service availability schedule, or a service continuity scenario; receiving, by the user device, a discovery request response indicating the one or more available EASs that satisfy the discovery request; selecting, by the user device, the target EAS from among the one or more available EASs; and communicating, by the user device, a media stream during the streaming session with the target EAS.

In some other implementations, a method of media streaming includes: receiving, by a Fifth Generation Media Streaming (5GMS) application function (AF) of an edge data network, edge resources information, the edge resources information received from a 5GMS application provider via an M1 interface, the edge resources configuration used to provision one or more edge application servers (EASs); and in response to receiving the edge resources information, sending, by the 5GMS AF, Service Access Information indicating an availability of edge resources to a user device via an M5 interface, the Service Access Information comprising an EAS discovery template used for discovery of a target EAS for a 5GMS streaming session.

In some other implementations, a method of edge resource processing includes: determining, with a Fifth Generation Media Streaming (5GMS) application provider of a data network, to obtain a list of one or more activated edge application servers (EASs); sending, with the 5GMS application provider, an activated EAS request to a 5GMS application function (AF) of an edge data network to obtain the list; and receiving, with the 5GMS application provider, the list from the 5GMS AF.

In some other implementations, a device for streaming media and/or edge resource processing is disclosed. The device may include circuitry configured to perform any one of the method implementations above.

Aspects of the disclosure also provide non-transitory computer-readable mediums storing instructions which when executed by a computer for streaming media and/or edge resource processing cause the computer to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
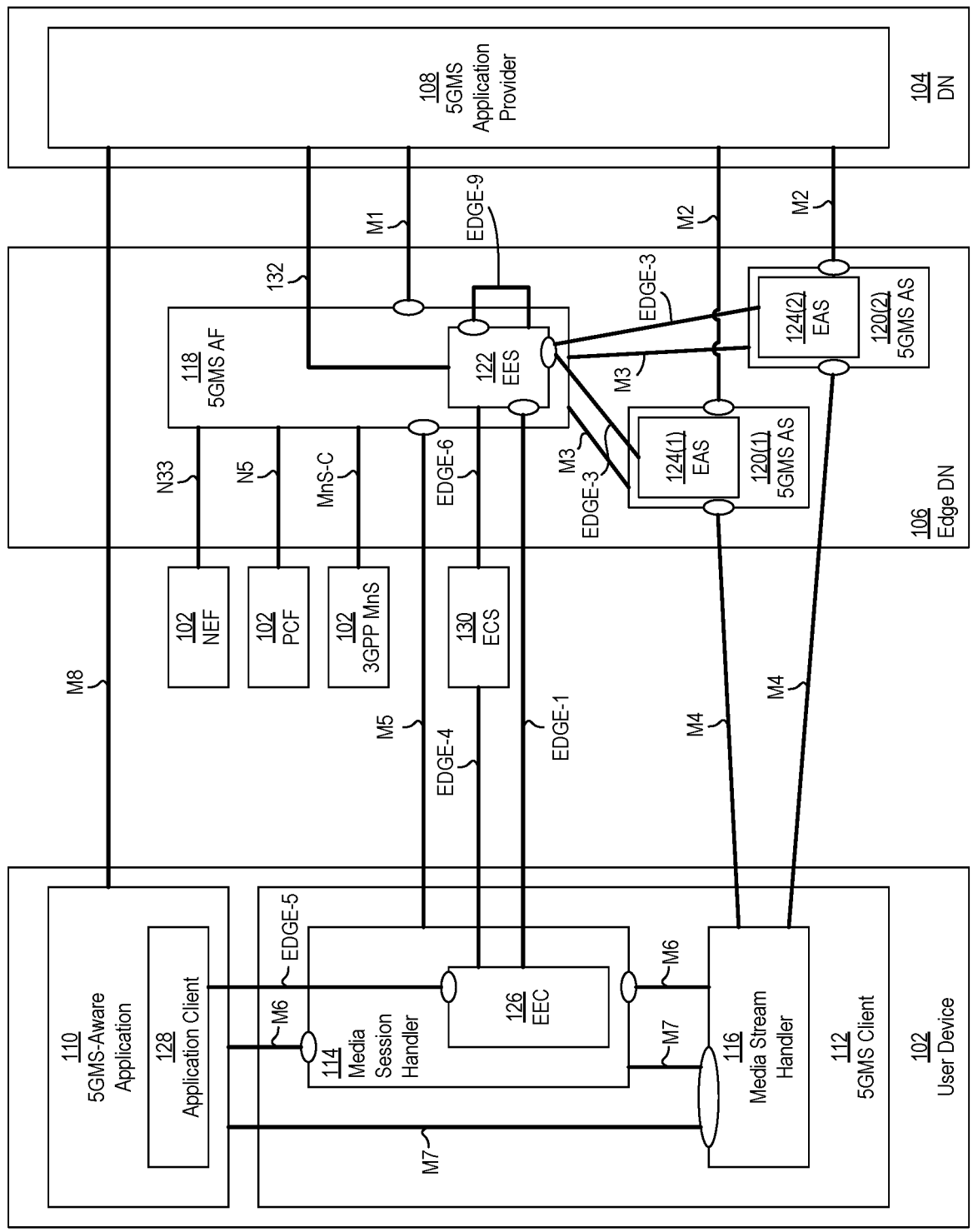
FIG. 1 shows a block diagram of an example edge-enabled Fifth Generation Media Streaming (5GMS) system.

FIG. 1 is a block diagram of an example configuration of an edge-enabled Fifth Generation Media Streaming (5GMS) system 100. In general, a 5GMS system is a collection or assembly of one or more Application Function (AF), one or more Application Servers (AS), and interfaces from 5GMS architecture that supports, or is configured to perform, mobile network operator (MNO) and third-party downlink media streaming services and MNO and third-party upload media streaming services. An edge-enabled 5GMS system has the functionality and 5GMS architecture of a 5GMS system and further supports, or is configured to perform, edge processing (e.g., media processing in an edge data network (DN)). In general, the term "edge" refers to a location at or relatively close to a user. Correspondingly, edge processing (or edge computing) refers to computer processing performed by one or more computing devices considered to be located at or close to a user device.

In the example configuration of FIG. 1, the edge-enabled 5GMS system 100 includes a user device 102, a data network (DN) 104, and an edge DN 106. In general, a user device as described herein, such as the user device 102, may include a single electronic device or apparatus, or multiple (e.g., a network of) electronic devices or apparatuses, capable of communicating over a network. A user device may comprise or otherwise be referred to as a user terminal, a user terminal device, or a user equipment (UE). Additionally, a user device may be or include, but not limited to, a mobile device (such as a mobile phone, a smart phone, a smart watch, a tablet, a laptop computer, vehicle or other vessel (human, motor, or engine-powered, such as an automobile, a plane, a train, a ship, or a bicycle as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples).

In addition, the DN 104 and the edge DN 106 may each include a computing device, or a plurality of computing devices, configured to communicate signals with the user device 102. At least some of the signals that are communicated may be characterized as downlink or uplink. As used herein, the term downlink refers to a transmission direction from a network (e.g., a DN or an edge DN) to a user device. Correspondingly, the network is the origin of the transmission and/or the information or content (e.g., media) included in the transmission, and the user device is the consumer, or acts as the consumption device, of the information or content. In this context, the network transmits, and the user device receives, a downlink transmission. Also, as used herein, the term uplink refers to a transmission direction from a user deice to a network (e.g., a DN or an edge DN). Correspondingly, the user device is the origin of the transmission and/or the information or content (e.g., media) included in the transmission, and the network is the consumer, or acts as the consumption deice, of the information or content. In this context, the user device transmits, and the network receives, an uplink transmission.

For the edge-enabled 5GMS system 100 of FIG. 1, the user device 102, the DN 104, and the edge DN 106 may be configured to establish one or more media sessions and stream media during the one or more media sessions. For at least some configurations, the user device 102, the DN 104, and the edge DN 106 may perform the media streaming and associated functions to establish the media streams and media according to one or more 5GMS technical specifications, standards, and/or protocols, such as Third Generation Partnership Project (3GPP) Technical Specification (TS) 26.501, for example.

In addition or alternatively, each of the user device 102, the DN 104, and the edge DN 106 may include one or more components or modules to enable the communication of media streams and/or establish the media streams and media sessions, such as according to 5GMS specifications. Such components are collectively referred to herein as 5GMS components. For the configuration shown in FIG. 1, the 5GMS components include a 5GMS application provider 108, a 5GMS-aware application 110, a 5GMS client 112, a media session handler 114, a media stream handler 116, a 5GMS application function (AF) 118, and a 5GMS application server (AS) 120. In other configurations, the 5GMS components may include more or fewer than those shown in FIG. 1. Also, as described in further detail below, the 5GMS components may be configured to communicate with each other via or through one or more interfaces M. Unless expressly described otherwise, each of the 5GMS components may be configured to communicate in both the uplink and downlink directions, and each of the interfaces M may handle communication in both the uplink and downlink directions. For at least some configurations, one or more of the 5GMS components and/or one or more of the interfaces M may be separated into a downlink portion to handle downlink functionality and an uplink portion to handle uplink functionality. For simplicity, separate downlink and uplink portions are not separately designated in FIG. 1 or otherwise referenced herein.

In general, the 5GMS application provider 108 is a module of the DN 104 that uses 5GMS for streaming services and that supplies or provides a 5GMS-aware application 110 to the user device 106. The 5GMS application provider 108 may perform, initiate, and/or establish a provisioning session to configure 5GMS features for the 5GMS-aware application 110. In addition or alternatively, the 5GMS application provider 108 may provide functionality and/or procedures used by the 5GMS-aware application 110 that enables the user device 106 to discover an available streaming service and content offerings and select a specific service or content item for access. In addition or alternatively, the 5GMS application provider 108 may perform a service announcement that enables the 5GMS-aware application 110 to obtain 5GMS Service Access Information. In addition or alternatively, the 5GMS application provider 108 uses 5GMS downlink (5GMSd) functions and/or 5GMS uplink (5GMSu) functions for downlink streaming services and/or uplink streaming services, respectively. In addition or alternatively, the 5GMS application provider 108 has content-specific media functionality, such as media creation, encoding, and formatting that uses 5GMS interfaces to stream media to and/or from the 5GMS-aware application 110.

The 5GMS-aware application 110 is a module of the user device 102 that includes service logic of one or more 5GMS application services, and participates in the delivery of a downlink and/or an uplink 5GMS service.

The 5GMS client 112 is a module of the user device 102 dedicated to 5GMS that provides modules internal to the user device 102 with interfaces and/or application programming interfaces (APIs) to communicate with each other and/or to modules or other components external to the user device 102 according to 5GMS. For some configurations such as shown in FIG. 1, the 5GMS client 112 may include the media session handler 114 and the media stream handler 116, although other configurations where one or both of the media session handler 114 or the media stream handler 116 is separate from the 5GMS client 112 may be possible. In other configurations, the user device 102 may include the media session handler 114 and the media stream handler 116, without necessarily having the 5GMS client 112.

The media session handler 114 is a module of the user device 102 that communicates with an 5GMS application function (AF) in order to establish, control, and/or support communication and/or delivery of media during a media session. For at least some configurations, the media session handler 114 may perform additional functions, such as consumption and quality of experience (QoE) metrics collection and reporting. Also, the media session handler 114 may provide network assistance, such as for downlink streaming delivery and/or by providing bit rate recommendations and/or estimations. In addition or alternatively, for at least some configurations, the media session handler 114 may expose one or more APIs for used by the 5GMS-aware application 110.

The media stream handler 116 is a module of the user device 102 that communicates with a 5GMS application server (AS) to perform downlink and/or uplink streaming of media content. The media stream handler 116 may also provide service to the 5GMS-aware application 110 for media capturing and uplink streaming, and to the media session handler 114 for media session control. Also, for at least some configurations, the media stream handler 116 may be configured with a media player that handles the media content streaming, and/or may provide one or more APIs to the 5GMS-aware application 110 for media playback and/or one or more APIs to the media session handler 114 for media session control.

The edge DN 104 is a local data network including one or more computing devices that supports and/or includes the architecture configured to enable edge applications and/or that performing edge computing or processing. The edge DN 106 may include one or more 5GMS application functions (AF) 118 and/or one or more application servers (AS) 120. In the example configuration in FIG. 1, the edge DN 106 includes one 5GMS AF 118 and two aSs 120(1), 120(2). Other configurations of one or more 5GMS AFs 118 and/or one or more 5GMS aSs 120 may be possible.

In general, a 5GMS AF 118 is a module that provides control functions to the media session handler 114 of the user device 102 and/or the 5GMS application provider 108 of the data network 102. For at least some configurations, the 5GMS AF 118 may relay or initiate a request for different Policy or Charging Function (PCF) treatments.

Also, in general, a 5GMS AS 120 is an application server dedicated to 5G media streaming and that hosts 5G media functions. A 5GMS AS 120 may communicate with the media stream handler 116 in order to stream media content. In addition or alternatively, a 5GMS AS 120 may perform content hosting, including, but not limited to, ingesting media content from the 5GMS application provider 108 and caching media content to reduce ingesting the same content repeatedly.

Also, the edge-enabled 5GMS system 100 may include a plurality of interfaces or APIs M used by the 5GMS components to communicate with each other. As shown in FIG. 1, each Mi (where i is an integer) may be used between a respective two of the 5GMS components.

M1 is used to supply a data structure during a provisioning session from the 5GMS application provider 108 to the 5GMS AF that configures features of the 5GMS-aware application 110. The M1 interface may enable the 5GMS application provider 108 to provision the usage of the edge-enabled 5GMS system 100 for downlink and uplink media streaming and to obtain feedback. In addition or alternatively, the 5GMS application provider 108 may use the M1 interface to provision resources in the edge DN 106 for the 5GMS-aware application 110, such as by configuring an edge processing resource template. For at least some configurations, the 5GMS application provider 108 may configure the following over the M1 interface: one or more conditions for activation of edge processing, such as traffic descriptors, an application identifier, or a geographic location of the user device 102; a selection of client-driven or AF-driven management; EAS profile information for each EAS 124 to serve an application, such as service key performance indicators (KPIs), a geographical location, and service continuity support; and/or application context relocation tolerance and requirements.

The M2 interface is an interface between the 5GMS 108 and a 5GMS AS 120 through which a 5GMS AS 120 ingests media content from the 5GMS application provider 108.

The M3 interface is an interface between the 5GMS AF 118 and a 5GMS AS 120 used to exchange information for content hosting on the 5GMS AS 120. The M3 interface may also be used to enable selection of a suitable one of a plurality of 5GMS ASs 120 for a media session.

The M4 interface M4 is an interface between a 5GMS AS 120 and the media stream handler 116. The M4 interface is used to communicate one or more media streams of media content (in the uplink and/or downlink directions) between the 5GMS AS 120 and the media stream handler 116.

The M5 interface M5 is an interface between the 5GMS AF 118 and the media session handler 114 used to communicate information to handle, control, report, and assist with media sessions. The 5GMS AF 118 and the media session handler 114 may also use the M5 interface to implement one or more security, authorization, and/or authentication mechanisms for the media sessions, and/or to report QoE metrics. In addition or alternatively, the 5GMS AF 118 may communicate Service Access Information to the media session handler 114 through the M5 interface in order to share configuration information about edge processing. In addition or alternatively, the 5GMS AF 118 may use the M5 interface to communicate consumption reporting and/or metrics reporting configuration information that is provisioned over the M1 interface and passed to the 5GMS client 112 by the 5GMS AF 118.

The M6 interface is an interface between the media session handler 114 and the media stream handler 116 and/or between the media session handler 114 and the 5GMS-aware application 110 for communication between two or more of the 5GMS-aware application 110, the media session handler 114, and the media stream handler 116. The media session handler 114 and/or the media stream handler 116 may use the M6 interface to configure the 5GMS-aware application 110 with 5GMS functionality or otherwise enable the 5GMS-aware application 110 to make use of 5GMS functionality. In addition or alternatively, the M6 interface may be used to configure 5GMS-related data reporting for the 5GMS-aware application 110.

The M7 interface is an interface between the media session handler 114 and the meda stream handler 116, and between the media stream handler 116 and the 5GMS-aware application 110. The M7 interface may allow the media session handler 114 and/or the 5GMS-aware application 110 to make use of the media player of the media stream handler 116, and/or used for configuration of QoE metrics to be measured and logged and/or the collection of metrics measurement logs by the user device 106. In addition or alternatively, the M7 interface may be used to configure, activate, and/or stop media capturing, media encoding, and/or media upstream client functions.

The M8 interface is an interface between the 5GMS application provider 108 and the 5GMS-aware application 110. In any of various configurations, the 5GMS application provider 108 may use the M8 interface to provide various information directly to the 5GMS-aware application 110, including Service Access Information, remote control commands, service announcement information, as non-limiting examples.

In addition, as previously described, the 5GMS system 100 of FIG. 1 is edge-enabled and/or capable of performing edge processing in order to perform 5G media streaming. The 5GMS system 100 may be edge-enabled by being configured with edge components that provide one or more of 5GMS components with edge computing or processing functionality. In this regard, the 5GMS AF 118 and the 5GMS ASs 120 may each be edge-enabled components and/or be configured to perform edge processing, as indicated by being part of the edge DN 106. Additionally, the user device 102 may be edge-enabled, at least by being able to communicate with the edge-enabled 5GMS 118 and the edge-enabled 5GMS AS 120 for media streaming. The 5GMS AF 118 may be an edge-enabled component at least by including a first type of edge component called an edge enabler server (EES) 122. Also, each 5GMS AS 120 may be an edge-enabled component by including a second type of edge component called an edge application server (EAS) 124. In addition, the user device 102 may be an edge-enabled component by including a third and fourth types of edge component called an edge enabler client (EEC) 126 and/or an application client 128, respectively. The edge components may also include an edge configuration server (ECS) 130. The edge components may communicate with each other according to one or more specifications, standards, and/or protocols, such as 3GPP TS 23.558 for example.

In general, the EES 122 supports, or is configured to perform, functions to support operation of the EAS(s) 124 and the EEC 126, including provisioning of configuration information to the EEC 126 and/or enabling exchange of application data traffic with the EAS(s) 124. Also, for at least some embodiments, the EES 122 may perform additional functions such as interacting with a core network (not shown in FIG. 1) to access capabilities of network functions, performing context transfer with the EEC 126, supporting external exposure of network and service capabilities to the EAS(s), registration functions (including registration, update, and de-registration for the EEC 126 and the EAS(s) 124, and/or triggering EAS instantiation on demand, as non-limiting examples. Other functions performed by the EES 122 may be possible.

In addition, in general, an EAS 124 is be configured to connect to the user device 102 to avail services of the 5GMS-aware application with the capability of edge computing. In addition, an EAS 124 may consume core network capabilities, such as by invoking core network capabilities via an edge enabler layer through the EES 122, invoking core network function APIs directly, and/or invoking core network capabilities through capability exposure functions. In addition or alternatively, an EAS 124 may expose its service APIs toward other EASs 124, such as by supporting API provider domain functions. In addition or alternatively, an EAS 124 may consume EAS service APIs exposed by other EASs, such as by supporting API invoker functionalities. Other functions or actions performed by an EAS 124 may be possible.

In addition, the EEC 126 is a module of the user device 102 configured to retrieve configuration information to enable the exchange of application data traffic with an EAS 124. Additionally, the EEC 126 may be configured to discover available EASs 124 in the Edge DN 106. In addition or alternatively, the EEC 126 may be configured to detect mobility events of the user device 106. For at least some configurations such as shown in FIG. 1, the EEC 126 may be part of or a component of the media session handler 114 of the user device 102, although other configurations where the EEC 126 is a separate component from the media session handler 114 may be possible.

In addition, the application client (AC) 128 is a module of the user device 102 that locates and/or connects to one or more EASs 124. For example, the AC 128 may determine to connect to an EAS 124 that it determines to be most suitable for servicing needs of the 5GMS-aware application 110. For at least some configurations such as shown in FIG. 1, the AC 128 may be part of or a component of the 5GMS-aware application 110, although other configurations where the AC 128 is a separate component from the 5GMS-aware application 110 may be possible.

In addition, in general, the ECS 130 is a module that provides supporting functions for the EEC 126 to connect with the EES 122. As example, the ECS 130 may provision edge configuration information to the EEC 126. For at least some configurations, the edge configuration information may include at least one of information for the EEC 126 to distinguish among multiple EESs 126, or information to establish a connection with one or more EESs 122. In some configurations, the ECS 130 may also support registration, update, and/or de-registration for the EES 122, and/or may interact with a core network to access capabilities of network functions. Other functions of the ECS 130 may be possible. For at least some configurations such as shown in FIG. 1, the ECS 130 is a component separate from each of the user device 102, the DN 104, and the edge DN 106, although other configurations where the ECS 130 is a component of the user device 102, the DN 104, or the edge DN 106 may be possible.

In addition, similar to the "M" interfaces used by the 5GMS components, the edge components may communicate with each other via a plurality of edge interfaces or APIs. As shown in FIG. 1, each edge interface is designated as EDGE j, where j is an integer.

EDGE-1 is an interface between the EES 122 and the EEC 126. EDGE 1 may be used by the EES 122 and the EEC 126 to communicate information pertaining to registration and de-registration of the EEC 126 to the EES 122, retrieval and provisioning of EAS configuration information, discovery of EASs 124 available in the edge DN 106, and/or service continuity procedures.

EDGE-3 is an interface between the EES 122 and an EAS 124. The EES 122 and an EAS 124 may use EDGE-3 to: register the EAS 124 with the EES 122 (which may include registering availability information such as time constraints and/or locations constraints); de-register the EAS 124 from the ESS; perform discovery of target EAS (T-EAS) information to support application context transfer (ACT); provide access to network capability information (such as location information); and/or request the setup of a data session between the AC 128 and an EAS 124, including communicating QoS information. Other information may be communicated, and/or other functions may be performed, using EDGE-3.

EDGE-4 is an interface between the EEC 126 and the ECS 130. The ECS 130 may provision edge configuration information to the EEC 126 using EDGE-4.

EDGE-5 is an interface between the EEC 126 and the application client 128.

EDGE-6 is an interface between the EES 122 and the ECS 130. The EES 122 and the ECS 130 may use EDGE-6 to: register the EES 122 with the ECS 130; de-register the EES 122 from the ECS 130; and/or retrieve target ESS information from the ECS 130.

EDGE-9 is an interface between two EESs 122. Two EESs 122 may use EDGE-9 to discover target EAS information to support application context relocation (ACR); for performance of EEC context relocation procedures; and/or transparent transfer of application context during edge enabler layer (EEL) managed ACR.

Other edge interfaces, including those between an edge component and a core network, not shown in FIG. 1, may be part of or otherwise used by the edge-enabled 5GMS system 100, in various other example configurations.

Additionally, as used herein, Service Access Information is a set of one or more parameters and/or addresses used by the user device 102, such as by the 5GMS client 112, to activate and control a streaming session. For at least some example configurations, the Service Access Information may also include one or more parameters and/or addresses used to report service, content, and/or QoE metrics. In some configurations, the user device 102 may receive Service Access Information directly from the DN 104. In other configurations, the user device 102 may receive Service Access Information from a 5GMS AF 118 of the edge DN 106. By being edge-enabled, the media session handler 114 of the user device 102 may be configured use the Service Access Information to determine whether a media streaming session meets eligibility criteria for requesting edge resources.

As mentioned, during provisioning, the 5GMS application provider 108 may request deployment of edge resources, and/or configure information about its edge processing requirements for media streaming sessions. During a provisioning session, the 5GMS application provider 108 may use the M1 interface to configure the information about its edge processing requirements. As part of the provisioning, the 5GMS application provider 108 may provision one or more new EASs 124 using the M1 interface. Using the M1 interface, the 5GMS application provider 108 may create, update, and/or retrieve edge resource configuration information. In turn, the 5GMS AF 118 may share configuration information about edge processing with the media session handler 114. The configuration information may be included as part of Service Access Information that the 5GMS AF 118 provides to the media session handler 114 through the M5 interface. Upon receipt of the Service Access Information from the 5GMS AF 118 by the media session handler 114, the EEC 126 may process the configuration information, and in turn, may request edge processing for a streaming session from the EES 122 of the 5GMS AF 118 using EDGE-1. Table 1 below lists a plurality of parameters (also called properties some or all of which may be included in Service Access Information that the 5GMS AF 118 provides to the media session handler 114.

TABLE 1

Example Properties of Service Access Information

| Property name | Type | Cardinality | Usage | Description | Applicability |
|---|---|---|---|---|---|
| provisioningSessionId | ResourceId | 1 . . . 1 | RO | Unique identification of the M1 Provisioning Session. | All types |
| provisioningSession Type | Provisioning Session Type | 1 . . . 1 | RO | The type of Provisioning Session. | All types. |
| StreamingAccess | Object | 0 . . . 1 | RO | | downlink |
| mediaPlayerEntry | Url | 0 . . . 1 | RO | A document or a pointer to a document that defines a media presentation e.g. MPD for DASH content or URL to a video clip file. | |
| ClientConsumptionReportingConfiguration | Object | 0 . . . 1 | RO | | downlink |
| reportingInterval | Duration Sec | 0 . . . 1 | RO | The time interval, expressed in seconds, between consumption report messages being sent by the Media Session Handler. The value shall be greater than zero. When this property is omitted, a single final report shall be sent immediately after the media streaming session has ended. | |
| serverAddresses | Array(Url) | 1 . . . 1 | RO | A list of 5GMSd AF addresses (URLs) where the consumption reporting messages are sent by the Media Session Handler. See NOTE. (Opaque URL, | |

TABLE 1-continued

Example Properties of Service Access Information

| Property name | Type | Cardinality | Usage | Description | Applicability |
|---|---|---|---|---|---|
| | | | | following the 5GMS URL format.) | |
| locationReporting | Boolean | 1 . . . 1 | RO | Stipulates whether the Media Session Handler is required to provide location data to the 5GMSd AF in consumption reporting messages (in case of MNO or trusted third parties). | |
| samplePercentage | Percentage | 1 . . . 1 | RO | The percentage of media streaming sessions that shall send consumption reports, expressed as a floating point value between 0.0 and 100.0. | |
| DynamicPolicyInvoca-tionConfiguration | Object | 0 . . . 1 | RO | | downlink, uplink |
| serverAddresses | Array(Url) | 1 . . . 1 | RO | A list of 5GMSd AF addresses (URLs) which offer the APIs for dynamic policy invocation sent by the Media Session Handler. See NOTE. (Opaque URL, following the 5GMS URL format.) | |
| validPolicyTemplateIds | Array(Re-sourceId) | 1 . . . 1 | RO | A list of Policy Template identifiers which the 5GMS Client is authorized to use. | |
| sdfMethods | Array(Sdf Method) | 1 . . . 1 | RO | A list of recommended service data flow description methods (descriptors), e.g. 5-Tuple, ToS, 2-Tuple, etc., which should be used by the Media Session Handler to describe the service data flows for the traffic to be policed. | |
| externalReferences | Array(String) | 0 . . . 1 | RO | Additional identifier for this Policy Template, unique within the scope of its Provisioning Session, that can be cross-referenced with external metadata about the media streaming session. Example: "HD_Premium". | |

| Property name | Type | Cardinality | Usage | Description | Applicability |
|---|---|---|---|---|---|
| ClientMetricsReporting Configurations | Array(Object) | 0 . . . 1 | RO | | downlink, uplink |
| serverAddresses | Array(Url) | 1 . . . 1 | RO | A list of 5GMS AF addresses to which metrics reports shall be sent. See NOTE. (Opaque URL, following the 5GMS URL format.) | |
| dataNetworkName | Dnn | 0 . . . 1 | RO | The DNN which shall be used when sending metrics reports. If not specified, the name of the default DN shall be used. | |
| reportingInterval | DurationSec | 0 . . . 1 | RO | The time interval, expressed in seconds, between metrics reports being sent by the Media Session Handler. The value shall be greater than zero. When this property is omitted, a single final report shall be sent immediately after the media streaming session has ended. | |
| samplePercentage | Percentage | 1 . . . 1 | RO | The percentage of media streaming sessions that shall report metrics, expressed as a floating point value between 0.0 and 100.0. | |
| urlFilters | Array(String) | 0 . . . 1 | RO | A non-empty list of URL patterns for which metrics reporting shall be done. The format of each pattern shall be a regular expression. If not specified, reporting shall be done for all sessions. | |
| metrics | Array(String) | 1 . . . 1 | RO | A list of metrics which shall be reported. | |
| NetworkAssistanceConfiguration | Object | 0 . . . 1 | RO | | downlink, uplink |
| serverAddress | Url | 1 . . . 1 | RO | Address of the 5GMS AF that offers the APIs for 5GMS AF-based Network Assistance, for access by the 5GMSd Media Session Handler. See NOTE. This address shall be an opaque URL, following the 5GMS URL format. | |
| ClientEdgeResources Configuration | Object | 0 . . . 1 | RO | Present only for Provisioning Sessions with client-driven edge computing management | downlink, uplink |

-continued

| Property name | Type | Cardinality | Usage | Description | Applicability |
|---|---|---|---|---|---|
| eligibilityCriteria | Edge Processing Eligibility Criteria | 0 . . . 1 | RO | mode provisioned. Conditions for activating edge resources for media streaming sessions in the scope of this Service Access Information. (See clause 6.4.3.8.) | |
| easDiscoveryTemplate | EASRequirements | 1 . . . 1 | RO | A template for the EAS discovery filter that shall be used by the EEC to discover and select a 5GMS EAS instance to serve media streaming sessions in the scope of this Service Access Information. (See clause 7.10.3.3.) | |
| easRelocation Requirements | array (M5EAS Relocation Requirements) | 0 . . . 1 | RO | EAS relocation tolerance and requirements. If absent, the EEC shall assume that relocation is tolerated by all 5GMS EAS instances in the scope of this Service Access Information. (See clause 11.2.3.3.) | |

NOTE:
In deployments where multiple instances of the 5GMSd AF expose the Media Session Handling APIs at M5, the 5G System may use a suitable mechanism (e.g. HTTP load balancing or DNS resolution) to direct requests to a suitable AF instance.

As indicated in the second-to-last row of Table 1, the Service Access Information may include an EAS Discovery Template (easDiscoveryTemplate) that may be a template for an EAS discovery filter used by the EEC 126 to discover and select from among one or more available EASs 124 as a target EAS 124 that serves the user device 102 during a media streaming session. Table 2 below lists a plurality of parameters or properties some or all of which may be included in an EAS Discovery Template that the 5GMS AF 118 provides to the media session handler 114.

TABLE 2

Example Properties of an EAS Discovery Template

| Property name | Type | Cardinality | Description |
|---|---|---|---|
| easProviderIds | array(string) | 1 . . . 1 | The set of acceptable providers of 5GMS EAS instances associated with this Provisioning Session. If empty, any EAS instances from any provider are acceptable. |
| easType | string | 1 . . . 1 | The type of 5GMS EAS instances associated with this Provisioning Session. |
| easFeatures | array(string) | 1 . . . 1 | 5GMS EAS service features required to be supported by EAS instances associated with this Provisioning Session. If empty, 5GMS EAS instances of the specified easType with any feature set are acceptable. |
| serviceKpi | EASServiceKPI | 0 . . . 1 | Service characteristics required to be satisfied by 5GMS AS EAS instances associated with this Provisioning Session. If absent, 5GMS EAS instances with any service characteristics are acceptable. |

TABLE 2-continued

Example Properties of an EAS Discovery Template

| Property name | Type | Cardinality | Description |
| --- | --- | --- | --- |
| serviceArea | Geographical ServiceArea | 0 . . . 1 | The list of geographical areas that 5GMS EAS instances associated with this Provisioning Session are required to serve.<br>If absent, 5GMS EAS instances shall serve all geographical areas whenever possible. |
| service Availability Schedule | array(Scheduled Communication Time) | 1 . . . 1 | The required availability schedule for 5GMS EAS instances associated with this Provisioning Session.<br>If empty, 5GMS EAS instances are required to be available at all times. |
| service Continuity Scenarios | array(ACRScenario) | 1 . . . 1 | The Application Context Relocation scenarios that 5GMS EAS instances associated with this Provisioning Session are required to support for service continuity.<br>If empty 5GMS EAS instances are not required to support service continuity across EAS relocation. |

In some example configurations, when the user device 102, such as via its media session handler 114, determines to communicate a media stream during a streaming session, the EEC 126 may send an EAS discovery request to the EES 122, such as via the EDGE-1 interface, to obtain information about available EASs 124. In response to the EAS discovery request, the EEC 126 may receive an EAS discovery request response from the EES 122 that indicates one or more available EASs 124 and their associated services from which the ECC 126 can identify or select a target EAS 124 with which to enter into the streaming session.

The discovery request that the EEC 126 sends may include one or more EAS discovery filters. An EAS discovery filter is a characteristic that the user device 102 wants an EAS 124 to have for a media streaming session. In some configurations, the one or more EAS discovery filters may be included as one or more information elements (IEs) in the discovery request. For at least some configurations, the one or more discovery filters that the EEC 126 includes in the EAS discovery request may match one or more of the parameters or properties of the EAS discovery template received from the 5GMS AF 118. Accordingly, the one or more discovery filters that the EEC 126 includes in the EAS discovery request may be in response to, or dependent on, the EAS discovery template properties included in the EAS discovery template. In addition, the EEC 126 may populate the one or more discovery filters with one or more discovery filter values for the one or more discovery filters.

In response to receipt of an EAS discovery request, the EES 122 may seek to identify one or more available EASs 124 that satisfy the one or more discovery filters includes in the EAS discovery template. To determine one or more available EASs 124, the ESS 122 may perform a discovery filter value matching process, where the EES 122 attempts to match the one or more discovery filter values with capabilities of one or more registered or candidate EASs 124 known to the ESS 122. As used herein, a candidate EAS 124 is an EAS 124 that the EES 122 is aware of, that has registered with the ESS 122, or that the EES 122 otherwise believes can potentially be an available EAS 124 that can satisfy an EAS discovery request. Also, the EES 122 may use any of various criteria for the discovery filter value matching to assess whether a candidate EAS 124 should be an available EAS 124 (e.g., that satisfies the one or more discovery filter values). For example, the EES 122 may identify a given candidate EAS 124 as an available EAS 124 if the given candidate EAS 124 has all of the discovery filter values, has at least (or exceeds) a threshold number of the discovery filter values, or has one or more particular, pre-determined discovery filter values, as examples. Upon performing the discovery filter value matching, the EES 122 may determine a discovery filter value matching result that indicates zero or one or more available EASs 124 that satisfy the EAS discovery request.

Additionally, upon finishing the discovery filter value matching, the EES 122 may generate a discovery request response that includes the discovery filter value matching result indicating zero or one or more available EASs 124 determined from the discovery filter value matching. The discovery request response may also indicate the characteristics of each of the one or more available EASs 124. The EES 122 may send the discovery request response to the EEC 126, such as via the EDGE-1 interface.

Upon receipt of the discovery request response, the EEC 126 may select a target EAS 124 from among one or more available EASs 124 indicated in the discovery request response. Otherwise stated, the EEC 126 may select an available EAS 124 from among the one or more available EASs 124 to be the target EAS 124. As mentioned, the target EAS 124 may be the available EAS 124 that the EEC 126 determines to be the best or most suitable EAS 124 for communicating a media stream during a media stream with the 5GMS-aware application 110. In event there are multiple available EASs 124 indicated in the discovery request response, the EEC 126 may use any of various criteria for selecting one available EAS 124 over the other available EASs 124 to be the target EAS 124 for the streaming session. Upon selecting the target EAS 124, one or more components of the user device 102, such as one or more of the media session handler 114, the EEC 126, the media stream handler 116, the 5GMS-aware application 110 and/or the application client 128, may operate to establish the media session with the target EAS 124, such that the target EAS 124 communicates streaming media during the streaming session with user device 102, such as with the media stream handler 116 via the M4 interface.

Figure 2:
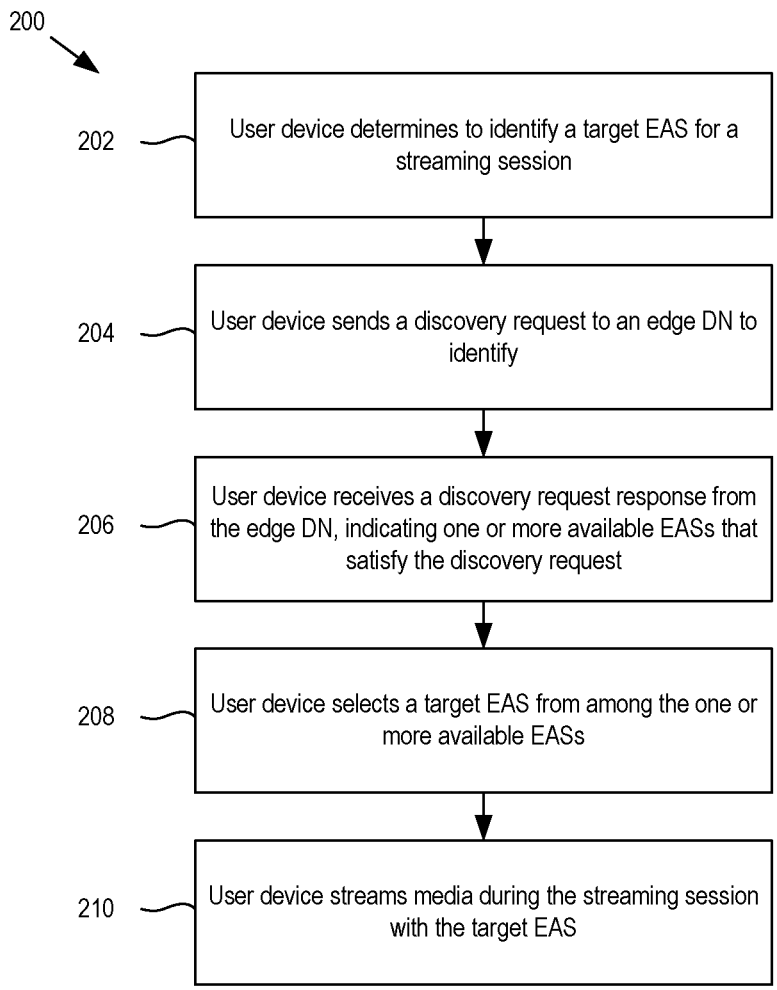
FIG. 2 shows a flow chart of an example method of media streaming performed by a user device.

FIG. 2 is a flow chart of an example method 200 of media streaming. The method 200 may be performed by a user device 102 that wants to stream media during a streaming session (in the downlink and/or uplink direction). At block 202, the user device 102 may determine to identify a target EAS 124 for a streaming session. Any of the various modules or components of the user device 102 may make the determination for any of various reasons. For example, the media session handler 114 and/or the EEC 126 may identify that the 5GMS-aware application 110 is to, or wants to, communicate a media stream during a streaming session, and in turn identify a target EAS 124 for the streaming session. As another example, the media session handler 114 and/or the EEC 126 may identify the 5GMS-aware application 110 and/or the application client 128, and in turn, identify a target EAS 124 for the 5GMS-aware application 110 and/or the application client 128 for a future or upcoming media session involving the 5GMS-aware application 110. As another example, the media session handler 114 may receive Service Access Information from the 5GMS AF 118, which in turn, may prompt the media session handler 114 and/or the EEC 126 to identify a target EAS 124 for the streaming session with the 5GMS-aware application 110.

A block 204, the user device 102 may send a discovery request to the edge DN 106 to identify one or more available EAS 124 for the media session. For example, the EEC 126 may send a discovery request to the EES 122, such as via the EDGE-1 interface, as previously described. The discovery request may include one or more discovery filters and associated one or more discovery filter values that indicate one or more characteristics the EEC 126 wants the target EAS 124 to have. The one or more discovery filters may include one or more of the properties of the EAS discovery template listed above in Table 2. For example, one or more of the discovery filters may match one or more of the properties included in an EAS discovery template of Service Access Information that the media session handler 114 receives from the 5GMS AF 118. The EEC 126 may select or determine all or less than all of the properties included in the EAS discovery template to be one or more discovery filters included in the discovery request.

For at least some implementations, at least one of the discovery filters may include at least one of: a service key performance indicator (KPI) (serviceKpi), a service area (serviceArea), a service availability schedule (serviceAvailabilitySchedule), or a service continuity scenario (serviceContinuityScenarios). As indicated above, a service KPI is one or more service characteristics to be satisfied by an EAS 124. A service area is a list of one or more geographical areas that an EAS 124 services. A service availability schedule is an availability schedule for an EAS 124. A service continuity scenario is one or more application context relocation scenarios that an EAS 124 supports for service continuity.

At block 206, the user device 102 may receive a discovery request response corresponding to the discovery request, such as from the edge DN 106. For example, the ECC 126 may receive the discovery request response from the EES 122, such as via the EDGE-1 interface. The discovery request response may indicate one or more candidate EASs 124 that satisfy the discovery request, such as by having one or more of the discovery filter values indicated in the discovery request. At block 208, the user device 102, such as with the EEC 126, may select a target EAS 124 from among the one or more candidate EASs 124 indicated in the discovery request response. At block 210, the user device 102 may stream media (in the downlink direction and/or the uplink direction) during the streaming session with the target EAS 124 that the user device 102 selected from the discovery request response. For example, the media stream handler 116 may stream media with the target EAS 124 via the M4 interface.

Figure 3:
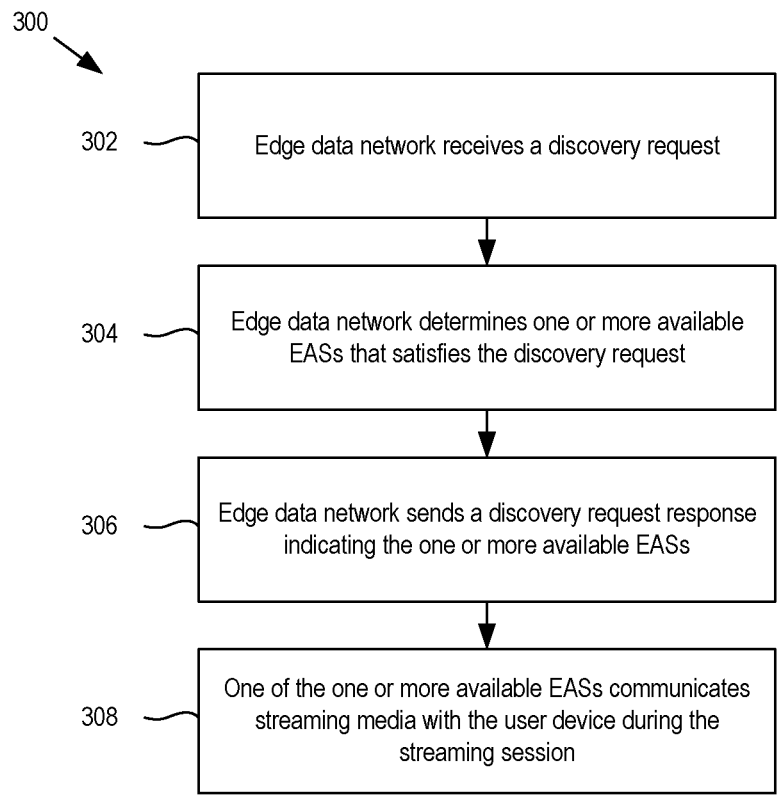
FIG. 3 shows a flow chart of an example method of media streaming performed by an edge network.

FIG. 3 shows a flow chart of an example method 300 of media streaming performed by the edge DN 106. At block 302, the edge DN 106 may receive a discovery request that includes one or more discovery filters and associated one or more discovery filter values from the user device 102. For example, the EES 122 of the edge network 106 may receive the discovery request from the EEC of the user device 102, such as via the EDGE-1 interface. For at least some implementations, one or more of the discovery filters may match one or more properties of an EAS discovery template that the edge network 106 sent to the user device 102. Correspondingly, for some implementations, at block 302, the edge network 106 may send a discovery filter template, such as part of Service Access Information as previously described, that includes one or more properties, and may receive the discovery request after, and/or in response to, sending the discovery filter template. Also, in some example implementations, the edge DN 106 may send the discovery filter template, such as part of the Service Access Information, after, and/or in response to, receipt of configuration information about edge processing from the DN 104. For example, the 5GMS AF 118 may receive the edge processing configuration information from the 5GMS application provider 108 of the DN 104 via the M1 interface during a provisioning session. In response to receiving the configuration information, the 5GMS AF 118 may send the Service Access Information to the media session handler 114, such as via the M5 interface. For at least some implementations, the information in the Service Access Information, including one or more of the properties included in the EAS discovery template, may depend on the configuration information received from the 5GMS application provider 108.

Also, for at least some implementations, the one or more discovery filters of the discovery request may include one or more of the properties included in an EAS discovery template that the edge DN 106 sends to the user device 102. The one or more properties may include one or more of those listed in the EAS discovery template above in Table 2. For at least some of these implementations, at least one of the discovery filters may include at least one of: a service KPI (serviceKpi), a service area (serviceArea), a service availability schedule (serviceAvailabilitySchedule), or a service continuity scenario (serviceContinuityScenarios).

At block 304, in response to receipt of the discovery request, the edge DN 106, such as via the EES 122, may identify one or more available EASs 124 that satisfy the discovery request. As previously described, the edge DN 106 may perform discovery value matching to determine which of one or more candidate EASs 124 satisfies the discovery request, and in turn, to identify as the one or more available EASs 124. At block 306, the edge DN 106, such as with the EES 122, may generate and send a discovery request response to the user device 102, such as the EEC 126 via the EDGE-1 interface, that indicates the one or more available EASs 124 that it identified. At block 308, one of the one or more available EASs 124 indicated in the discovery request response may communicate streaming media (in the downlink direction and/or the uplink direction) during a streaming session after and/or in response to the discovery request response.

As mentioned, in some implementations, the EAS discovery template that the edge network 106 sends to the user device 102, and/or the discovery request that the user device 102 sends to the edge network 106, may include at least one of the following properties: a service KPI (serviceKpi), a service area (serviceArea), a service availability schedule (serviceAvailabilitySchedule), or a service continuity scenario (serviceContinuityScenarios). Particular of these implementations may include one or more of these properties in combination with one or more additional properties including one or more of the following: an EAS provider ID (easProviderIds), an EAS type (easType), or one or more EAS features (easFeatures). Such implementations may contrast with other implementations that do not include any of a service KPI (serviceKpi), a service area (serviceArea), a service availability schedule (serviceAvailabilitySchedule), or a service continuity scenario (serviceContinuityScenarios). For example, such other implementations may include only one or more of: an EAS provider ID (easProviderIds), an EAS type (easType), or one or more EAS features (easFeatures). However, by including at least one of a service KPI (serviceKpi), a service area (serviceArea), a service availability schedule (serviceAvailabilitySchedule), or a service continuity scenario (serviceContinuityScenarios) in the discovery request, the EES 122 may select an improved group of EASs 124 for participating in a streaming session with the user device 102. For example, the EES 122 may identify candidate EASs 124 that it otherwise would not have for discovery requests that do not include these properties, and/or may avoid identifying as candidates certain EASs 124 that are less than optimal because they do not have one or more of a particular service KPI, a particular service area, a particular service availability schedule, or a particular service continuity scenario that the EEC 126 wants the target EAS 124 to have.

Accordingly, in some implementations, the 5GMS-aware application 110 may instantiate an EAS 124. In general, an EAS 124 is instantiated when it is able to run an application to stream media with the user device 102. In particular implementations, when a 5GMS-aware application is to stream media content during a streaming session, an EAS 124 may be instantiated for the streaming session when it is able to run an application to allow the EAS 124 to stream media content with or for the 5GMS-aware application. Edge server requirements received by the M1 interface is delivered as part of Service Access Information through the M5 interface to the user device (client) 102. The user device (client) 102 may use one or more edge discovery interfaces (e.g., APIs) to discover one or more matching, available EASs 124.

As previously mentioned, the 5GMS application provider 108 may provision a new EAS 124 using the M1 interface. Through the M1 interface, the 5GMS application provider 108 may create, update, and/or retrieve an edge resource configuration. In some implementations, the 5GMS application provider may do so using operations listed in the below Table 3.

TABLE 3

Operations Supported by 5GMS Application Provider for Edge Resource Configurations

| Operation | Sub-resource path | Allowed HTTP method(s) | Description |
|---|---|---|---|
| Configure Edge Resources | edge-resources-configurations | POST | Invoked on the Edge Resources Configurations collection to create a new Edge Resources Configuration. If the operation succeeds, the URL of the newly created Edge Resources Configuration resource shall be returned in the Location header of the response. |
| Retrieve Edge Resources Configuration | edge-resources-configurations/ {edgeResourcesConfigurationId} | GET | Used to retrieve a specific Edge Resources Configuration resource. |
| Modify Edge Resources Configuration | | PUT, PATCH | Used to modify or replace an existing Edge Resources Configuration resource. |
| Destroy Edge Resources Configuration | | DELETE | Used to destroy an existing Edge Resources Configuration resource. |

Additionally, for at least some implementations, the 5GMS application provider 108 may use one or more properties for an Edge Resources Configuration listed in the below Table 4.

TABLE 4

Edge Resource Configuration Properties

| Property name | Type | Cardinality | Description |
|---|---|---|---|
| edgeResourcesConfigurationId | ResourceId | 1 . . . 1 | An identifier for this Edge Resources Configuration that is unique within the scope of the enclosing Provisioning Session. |
| edgeManagementMode | EdgeManagementMode | 1 . . . 1 | Indicates whether the management of edge resources is application-driven or network-driven. |
| eligibilityCriteria | EdgeProcessing Eligibility Criteria | 0 . . . 1 | Condition to activate edge resources for this Provisioning Session. If the activation Trigger element is not provided, it shall be assumed that all media |

TABLE 4-continued

Edge Resource Configuration Properties

| Property name | Type | Cardinality | Description |
| --- | --- | --- | --- |
| | | | sessions related to the parent Provisioning Session will use edge resources. |
| easRequirements | EASRequirements | 1 . . . 1 | Requirements on the EAS Profile used by the 5GMS AF or by the EEC to discover and select one or more 5GMS EAS instances to serve media streaming sessions. |
| easRelocation Requirements | array(M1EAS Relocation Requirements) | 0 . . . 1 | EAS relocation tolerance and requirements. If not present, the 5GMS AF shall assume that the application is unaware of context transfer and that transfers to a target 5GMS EAS are allowed. |
| easIdFlag | boolean | 0 . . . 1 | If true, the 5GMS AF is requested to include the acitivated easIds during the folllowing operation: Retrieve Edge Resources Configuration The default is false. |
| easId | Array of string | 0 . . . 1 | Identifier of EAS which are activated by 5GM AF to address this resource configuration. This property may only be included in the response of the following operation: Retrieve Edge Resources ConfigurationCon Note: The Application Service Provider's API EAS discovery is outside of the scope of this document. |

Figure 4:
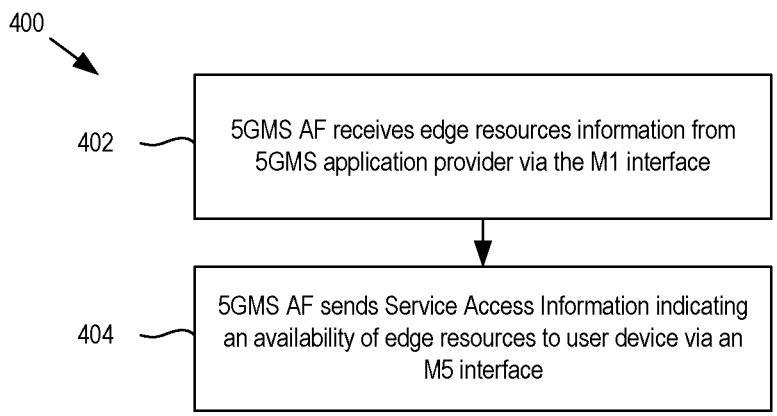
FIG. 4 shows a flow chart of another example method of media streaming performed by an edge network.

FIG. 4 is a flow chart of another example method 400 of media streaming performed by the edge DN 106. At block 402, the 5GMS AF 118 may receive edge resource information. The edge resources information may be received from the 5GMS application provider 108 via the M1 interface. In addition or alternatively, the edge resources information may be used to create an edge resource configuration. In addition or alternatively, the edge resources information may be used to provision one or more EASs 124. At block 404, the 5GMS AF 118 may send Service Access Information to the user device 102, such as to the media session handler 114. As previously described, the Service Access Information may indicate an availability of edge resources to the user device 102. In addition or alternatively, the 5GMS AF 118 may send the Service Access Information to the user device 102 via the M5 interface. In addition or alternatively, the Service Access Information may include an EAS discovery template including one or more properties, as previously described. In some implementations, the one or more properties may include one or more of: a service KPI, a service area, a service availability schedule, or a service continuity scenario. Also, in some embodiments, the EES 118 may receive a discovery request in response to sending the Service Access Information. The discovery request may include one or more discovery filters, where at least one discovery filter matches at least one property included in the EAS discovery template. The EES 118 may identify one or more available EASs 124 that satisfy the discovery request, and send a discovery response that identifies the one or more available EASs 124, as previously described.

In some implementations, the 5GMS application provider 108 may want or determine to obtain a list of activated EASs 124. In general, an activated EAS 124 is an EAS 124 that has participated in a streaming session and/or streamed media with the user device 102. As mentioned, a target EAS 124 is an EAS that the user device 102 may select from among the one or more available EASs 124 identified from the edge DN 106. When the user device 102 and the target EAS 124 media during a streaming session, the target EAS 124 is an activated EAS 124. Depending on the number of activated EASs 124, the list may include zero or one or more activated EASs 124, at any of various times or situations. To obtain the list, the 5GMS application provider 108 may send an activated EAS request to the 5GMS AF 118 via interface M1 that indicates to, or commands, the 5GMS AF 118 to send or return the list to the 5GMS application provider 108. In some implementations, the activated EAS request may include an EAS identification (ID) flag (e.g., easIdFlag in Table 3). The EAS ID flag may indicate to the 5GMS AF 118 whether to return the list of activated EASs 124. For example, in some implementations, the EAS ID flag may be a first value (such as a Boolean logic "1" or logic "0" value) that indicates to the 5GMS AF 118 to return the list or a second value (such as the other Boolean logic "0" or logic "1" value) not to return the list.

In response to receipt of the activated EAS request, the 5GMS AF 118 may retrieve the list of activated EASs 124, and return or send the list to the 5GMS application provider 108, such as via the M1 interface. For at least some implementations, the list may include EAS IDs of the activated EASs 124 (e.g., easId in Table 3) to indicate the activated EASs 124.

In some implementations, the activated EAS request may be part of an edge resources configuration request. For example, the edge resources configuration request may indicate to, or instruct, the 5GMS AF 118 to retrieve an edge resource configuration, and send the retrieved edge resource configuration to the 5GMS application provider 108. The edge resource configuration request may include one or more of the following properties in Table 4, including an edge resources configuration ID (edgeResourcesConfigurationId), an edge management mode (edgeManagementMode), an eligibility criteria (eligibilityCriteria), EAS requirements (easRequirements), or EAS relocation requirements (easRelocationRequirements). The edge resource configuration request may further include an EAS ID flag that indicates whether to include a list of activated EASs 124 with, or as part of, the edge resource configuration that the 5GMS AF 118 returns to the 5GMS application provider 108. Upon receipt of the edge resource configuration request, the 5GMS AF 118 may check the EAS ID flag. If the EAS ID flag indicates to return a list of activated EASs 124 (such as by being the first value), then the 5GMS AF 118 may retrieve the list of activated EASs 124, include the list of activated EASs 124 with the rest of the edge resource configuration, and return the edge resource configuration with the list of activated EASs 124 to the 5GMS application provider 108.

In addition or alternatively, in some implementations, the activated EAS request and/or the EAS ID flag may indicate to, or instruct, the 5GMS AF 118 to retrieve the list of activated EASs 124 during an edge resources configuration retrieval operation. That is, irrespective of whether the activated EAS request and/or the EAS ID flag is part of, or included with, an edge resources configuration request, the activated EAS request and/or the EAS ID flag may indicate to the 5GMS AF 118 to retrieve the list of activated EASs 124 during an edge resource configuration retrieval operation. In turn, when the 5GMS AF 118 performs an edge resource configuration retrieval operation, the 5GMS AF 118 may retrieve the list of activated EASs 124 as part of the operation.

Upon receipt of the list of activated EASs 124, the 5GMS application provider 108 may perform one or more actions associated with, and/or using the EAS IDs. For example, the 5GMS application provider 108 may determine a health status of a given activated EAS 124, such as one or more processing powers used (e.g,. a central processing unit (CPU) power and/or a graphics processing unit (GPU)), a network bandwidth used, volatile memory (e.g., random access memory (RAM)) used, and/or non-volatile memory (memory storage) being used. Upon knowing an EAS ID, the 5GMS application provider 108 may use the EAS ID to obtain one or more health status parameters of the activated EASs identified by the EAS ID. As another example, the 5GMS application provider 108 may associated an EAS report with a particular EAS 124. For example, the 5GMS application provider 108 may receive a report pertaining to a streaming session, such as a consumption report and/or a QoE report, including one or more of various parameters and/or statistics in connection with a streaming session, such as a duration of the streaming session, a part of the media content that was communicated or consumed, popularity statistics, statistics related to media content in the uplink and downlink directions, as non-limiting examples. Upon receipt of the listed of activated EASs 124, the 5GMS application provider 108 may link or associate a given report with a given activated EAS 124 using an activated EAS ID included in the list.

Additionally, in some implementations, the 5GMS application provider 108 may obtain EAS profiles of one or more activated EASs 124. For at least some of these implementations, the 5GMS application provider 108 may retrieve the one or more activated EAS profiles from the EES 122. In particular of these implementations, the 5GMS application provider 108 may communicate with the EES 122 directly via an interface 132 extending between the 5GMS application provider 108 and the EES 122 to obtain the EAS profiles of the activated EASs 124. As shown in FIG. 1, the interface 132 is a different or separate interface than the M1 interface. The 5GMS application provider 108 may send an activated EAS profile request to the EES 122, such as via the interface 132. In response to receipt of the request, the 5GMS application provider 108 may obtain EAS profiles of one or more activated EASs 124, and send or return the EAS profiles to the 5GMS application provider 108.

In addition, in some implementations, the 5GMS application provider 108 may send an activated EAS profile request after receiving a list of activated EASs 124 from the 5GMS AF 118, such as via the M1 interface. After, or in response to, receiving the list of activated EASs 124, the 5GMS application provider 108 may send an EAS profile request, including the list of activated EASs 124, to the EES 122. In some implementations, the list of activated EASs 124 may include EAS IDs (e.g., easId in Table 4) of the activated EASs 124, as previously described. Correspondingly, in response to receipt of the EAS IDs of the activated EASs 124, the 5GMS application provider 108 may include the EAS IDs in the activated EAS profile request that it sends to the EES 122. In response, the EES 122 may obtain the EAS profiles associated with the EAS IDs, and return those EAS profiles as part of its response to the activated EAS profile request to the 5GMS application provider 108.

In some embodiments, the 5GMS application provider 108 may assess or confirm an allocation of one or more activated EASs 124 using one or more of the EAS profiles it receives. For example, using an EAS profile, the 5GMS application provider 108 may assess whether an activated EAS 124 associated the EAS profile was properly allocated or selected for participating in a media session. For example, the allocated EAS 124 may have an associated set of maximum operating parameters, such as a maximum CPU power, a maximum GPU power, volatile and/or non-volatile storage capacity, and/or maximum bandwidth. In various embodiments, one or more of the maximum operating parameters may be defined by a service KPI. Using the EAS profile of an activated EAS 124, the 5GMS application provider 108 may assess or confirm whether or not the actual operating parameters are within the bounds of the maximum operating parameters, and in turn, determine whether or not the activated EAS 124 was properly allocated.

Figure 5:
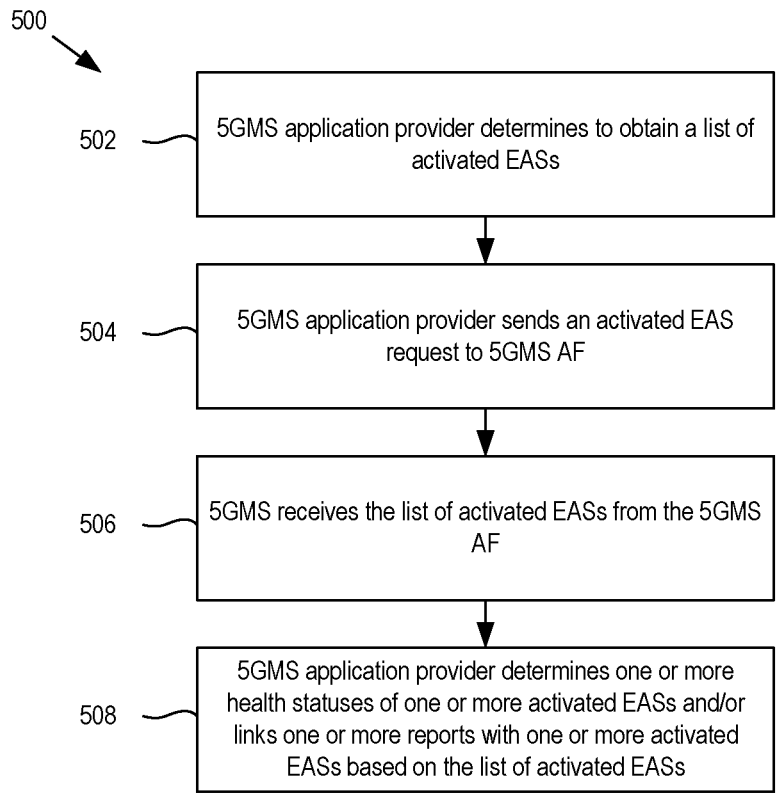
FIG. 5 shows a flow chart of an example method of edge resource processing performed by a 5GMS application provider.

FIG. 5 is a flow chart of an example method 500 for edge resource processing. At block 502, the 5GMS application provider 108 may determine to obtain a list or record identifying one or more activated EASs 124 in the edge DN 106. At block 504, the 5GMS application provider 108 may send an activated EAS request to the 5GMS AF 118. For at least some implementations, the 5GMS application provider 108 may send the activated EAS request via the M1 interface. Also, for at least some implementations, the activated EAS request may include an EAS identification (ID) flag that indicates to the 5GMS AF 118 whether or not to return a list of activated EASs 124 to the 5GMS application provider 108. In addition or alternatively, for at least some implementations, the activated EAS request, and/or the EAS ID flag, may be part of an edge resource configuration request. At block 506, the 5GMS application provider 108 may receive a list of one or more activated EASs 124 in response to, and/or associated with, the activated EAS request. At block 408, the 5GMS application provider 108 may determine one or more health statuses and/or link one or more reports about one or more streaming sessions with one or more activated EASs 124_based on, or using, the list of one or more activated EASs 124, as previously described.

Figure 6:
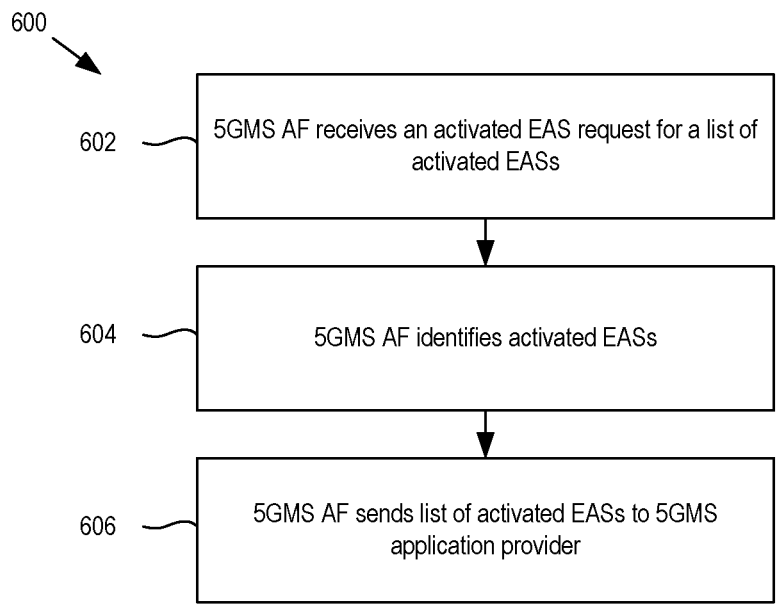
FIG. 6 shows a flow chart of an example method of edge resource processing performed by a 5GMS application function (AF).

FIG. 6 is a flow chart of an example method 600 of edge resource processing. At block 602, the 5GMS AF 118 may receive an activated EAS request to obtain a list or record identifying one more activated EASs 124 in the edge DN 106. At block 604, the 5GMS AF 118 may identify the activated EASs 124, and indicate or include them in the list of activated EASs 124. At block 606, the 5GMS AF may send the list of activated EASs 124 to the 5GMS application provider 108. In some implementations, the 5GMS AF 118 may indicate the activated EASs 124 may included the EAS IDs of the activated EASs 124 in the list.

Figure 7:
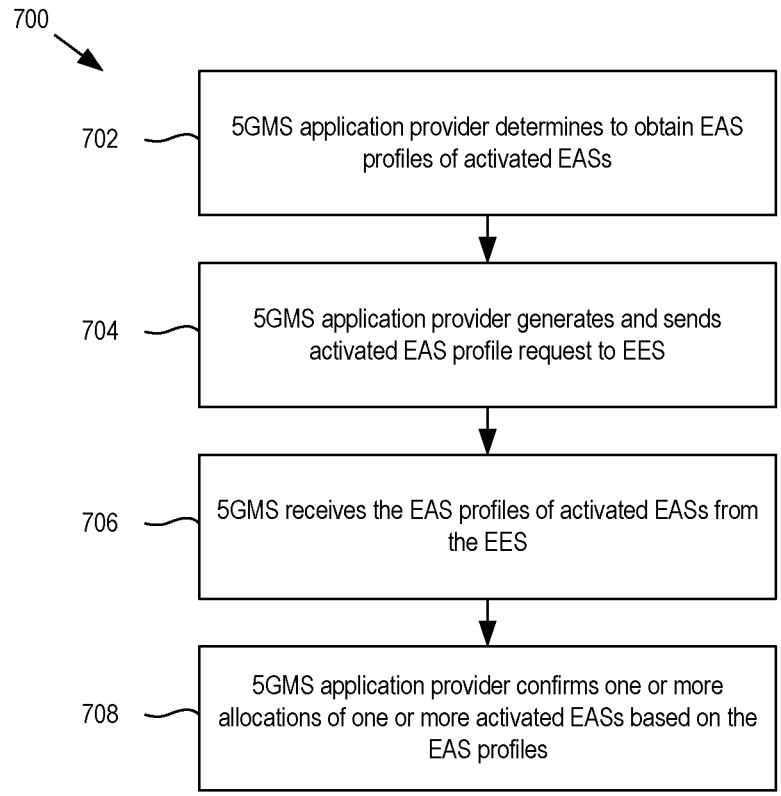
FIG. 7 shows a flow chart of another example method of edge resource processing performed by a 5GMS application provider.

FIG. 7 is a flow chart of an example method 700 of edge resource processing. At block 702, the 5GMS application provider 108 may determine to obtain EAS profiles of activated EASs 124. At block 704, the 5GMS application provider 108 may generate and/or send an activated EAS profile request to obtain the EAS profiles. In some implementations, the 5GMS application provider 108 sends the activated EAS profile request to the EES 122. In particular of these implementations, the 5GMS application provider 108 sends the activated EAS profile request to the EES 122 via the interface 132 that is separate or different from the M1 interface. As explained, the separate interface 132 may extend between the 5GMS application provider 108 and the EES 122. In addition or alternatively, in some implementations, the 5GMS application provider may include EAS IDs of activated EASs 124 for which it wants to receive the EAS profiles. At block 706, the 5GMS application provider 108 may receive EAS profiles of activated EASs 124 in response to the activated EAS profile request. In some implementations, the 5GMS application provider 108 may receive the EAS profiles from the ESS 122. In particular of these implementations, the 5GMS application provider 108 may receive the EAS profiles via the separate interface 132 between the 5GMS application provider 108 and the EES 122. At block 708, the 5GMS application provider 108 may assess or confirm one or more allocations of one or more activated EASs 124_based on, or using, the EAS profiles, as previously described.

Figure 8:
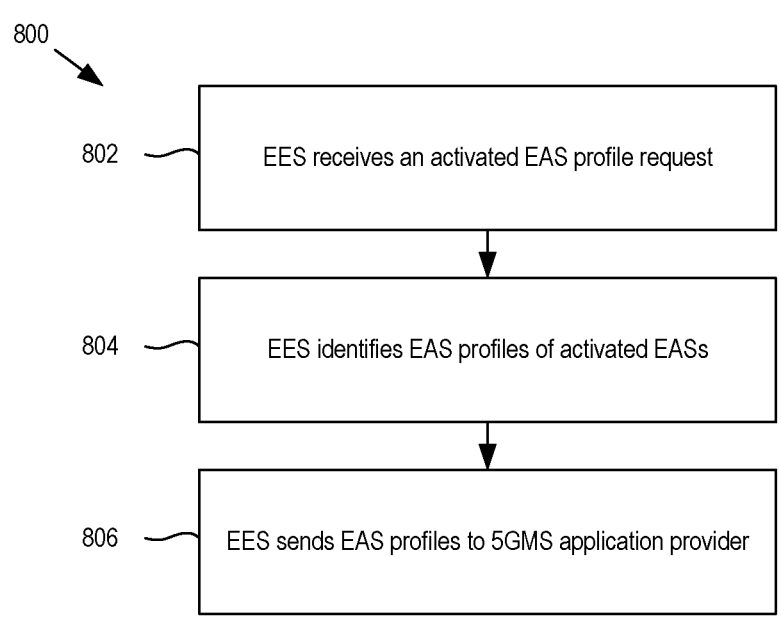
FIG. 8 shows a flow chart of another example method of edge resource processing performed by a 5GMS AF.

FIG. 8 is a flow chart of an example method 800 of edge resource processing. At block 802, the EES 122 may receive an activated EAS profile request. In some implementations, the EES 122 may receive the activated EAS profile request via the interface 132 that is different or separate from the M1 interface. At block 804, in response to receipt of the activated EAS profile request, the EES 122 identify or obtain the EAS profiles. At block 806, the EES may send the EAS profiles of activated EASs 124 to the 5GMS application provider 108. In some implementations, the EES 122 may send the EAS profiles via the separate interface 132. In addition or alternatively, in some implementations, the activated EAS profile request may include EAS IDs, and the EES 122 may obtain the EAS profiles of activated EASs identified by those EAS IDs (i.e., the EAS profiles associated with the EAS IDs).

Other methods of edge resource processing that combine one or more blocks of two or more of the methods 400, 500, 700, 800 may be possible. For example, at block 704, when the 5GMS application provider 108 generates the activated EAS profile request, the 5GMS application provider 108 may include the activated EASs 124 it identifies from the activated EAS request response it receives at block 406. For example, the 5GMS application provider 108 may receive a list of EAS IDs of activated EASs 124, and in turn, include the EAS IDs in the activated EAS profile request it sends to the EES 122. Other similar methods that combine one or more blocks of the methods 500 and 800 may also be performed.

In addition, as used herein, the term module refers to electronics, implemented in hardware only or a combination of hardware or software, configured to implement or carry out one or more functions or actions. For example, a module may include a circuit, digital logic circuitry, a processor (e.g., a central processing unit (CPU)) or a controller, configured to execute computer executable instructions, a memory storing computer executable instructions configured to be executed by a processor or a controller, or any of various combinations thereof.

Further, the techniques described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
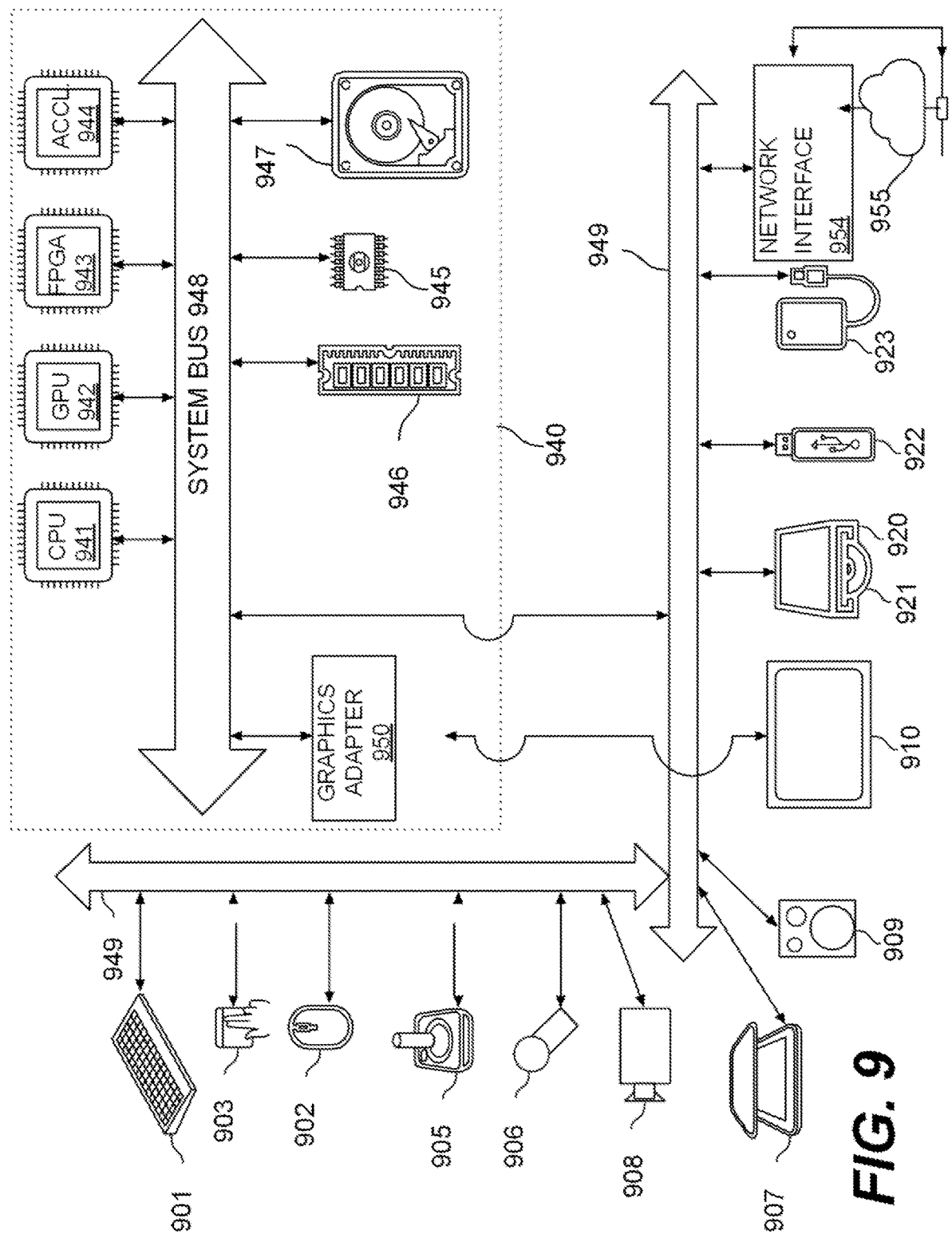
FIG. 9 shows a block diagram of an example computer system.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove (not shown), joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove (not shown), or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include an interface 954 to one or more communication networks 955. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses 949 (such as, for example USB ports of the computer system 900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, graphics adapters 950, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. In an example, the screen 910 can be connected to the graphics adapter 950. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition, or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The subject matter of the disclosure may also relate to or include, among others, the following aspects:

In a first aspect, a method of media streaming includes: determining, by a user device, to determine a target edge application server (EAS) for a Fifth Generation Media Streaming (5GMS) streaming session with a 5GMS-aware application of the user device; sending, by the user device, a discovery request to identify one or more available EASs for the streaming session, wherein the discovery request comprises one or more discovery filters, the one or more discovery filters comprising one or more of: a service key performance indicator (KPI), a service area, a service availability schedule, or a service continuity scenario; receiving, by the user device, a discovery request response indicating the one or more available EASs that satisfy the discovery request; selecting, by the user device, the target EAS from among the one or more available EASs; and communicating, by the user device, a media stream during the streaming session with the target EAS.

A second aspect includes the first aspect, and further includes wherein the one or more discovery filters comprises the service KPI.

A third aspect includes any of the first or second aspects, and further includes wherein the one or more discovery filters comprises the service area.

A fourth aspect includes any of the first through third aspects, and further includes wherein the one or more discovery filters comprises the service availability schedule.

A fifth aspect includes any of the first through fourth aspects, and further includes wherein the one or more discovery filters comprises the service continuity scenario.

A sixth aspect includes any of the first through fifth aspects, and further includes: receiving, by the user device, Service Access Information from an edge data network, wherein the Service Access Information comprises an EAS discovery template comprising one or more of the service KPI, the service area, the service availability schedule, or the service continuity scenario.

A seventh aspect includes the sixth aspect, and further includes: setting, by the user device, the one or more discovery filters to comprise one or more of the service KPI, the service area, the service availability schedule, or the service continuity scenario in response to the EAS discovery template of the Service Access Information comprising one or more of the service KPI, the service area, the service availability schedule, or the service continuity scenario.

An eighth aspect includes a method of media streaming that includes: receiving, by a Fifth Generation Media Streaming (5GMS) application function (AF) of an edge data network, edge resources information, the edge resources information received from a 5GMS application provider via an M1 interface, the edge resources configuration used to provision one or more edge application servers (EASs); and in response to receiving the edge resources information, sending, by the 5GMS AF, Service Access Information indicating an availability of edge resources to a user device via an M5 interface, the Service Access Information comprising an EAS discovery template used for discovery of a target EAS for a 5GMS streaming session.

A ninth aspect includes the eighth aspect, and further includes: in response to sending the service access information, receiving, by an edge enabler server (EES) of the edge data network, a discovery request to identify one or more available EASs for the streaming session, the discovery request comprising at least one discovery filter that matches at least one property of the EAS discovery template; identifying, by the EES, one or more available EASs that satisfy the discovery request; and sending, by the EES, a discovery response that identifies the one or more available EASs.

A tenth aspect includes any of the eighth or ninth aspects, and further includes wherein a property of the EAS discovery template comprises a service key performance indicator (KPI).

An eleventh aspect includes any of the eighth through tenth aspects, and further includes wherein a property of the EAS discovery template comprises a service area.

A twelfth aspect includes any of the eighth through eleventh aspects, and further includes wherein a property of the EAS discovery template comprises a service availability schedule.

A thirteenth aspect includes any of the eighth through twelfth aspects, and further includes wherein a property of the EAS discovery template comprises a service continuity scenario.

A fourteenth aspect includes any of the eighth through thirteenth aspects, and further includes: communicating, by the target EAS, a media stream during the 5GMS streaming session with the user device.

A fifteenth aspect includes a method of edge resource processing that includes: determining, with a Fifth Generation Media Streaming (5GMS) application provider of a data network, to obtain a list of one or more activated edge application servers (EASs); sending, with the 5GMS application provider, an activated EAS request to a 5GMS application function (AF) of an edge data network to obtain the list; and receiving, with the 5GMS application provider, the list from the 5GMS AF.

A sixteenth aspect includes the fifteenth aspect, and further includes wherein the activated EAS request is sent over an M1 interface between the 5GMS application provider and the 5GMS AF.

A seventeenth aspect includes any of the fifteenth or sixteenth aspects, and further includes wherein the list of the one or more activated EASs is received over an M1 interface between the 5GMS application provider and the 5GMS AF.

An eighteenth aspect includes any of the fifteenth through seventeenth aspects, and further includes wherein the activated EAS request comprises an EAS identification (ID) flag that indicates to the 5GMS AF whether to return the list of the one or more activated EASs to the 5GMS application provider.

A nineteenth aspect includes any of the fifteenth through eighteenth aspects, and further includes: sending, with the 5GMS application provider, an edge resource configuration request to the 5GMS AF, wherein the activated EAS request is part of the edge resource configuration request.

A twentieth aspect includes any of the fifteenth through nineteenth aspects, and further includes: sending, with the 5GMS application provider, an activated EAS profile request to an edge enabled server (EES) for one or more EAS profiles of the one or more activated EASs indicated in the list, the activated EAS profile request sent over an interface different from an M1 interface between the 5GMS application provider and the 5GMS AF.

A twenty-first aspect includes a media streaming device comprising a memory storing a plurality of instructions, and a processor configured to execute the plurality of instructions, and upon execution of the plurality of instructions, is configured to implement any of the first through twentieth aspects.

A twenty-second aspect includes a non-transitory computer-readable storage medium storing a plurality of instructions executable by a processor, wherein upon execution by the processor, the plurality of instructions is configured to cause the processor to implement any of the first through twentieth aspects.

In addition to the features mentioned in each of the independent aspects enumerated above, some examples may show, alone or in combination, the optional features mentioned in the dependent aspects and/or as disclosed in the description above and shown in the figures.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

3GPP: Third Generation Partnership Project
5GMS: Fifth Generation Media Streaming
AC: Application Client
ACR: Application Context Relocation
ACT: Application Context Transfer
AF: Application Function
AS: Application Server
DN: Data Network
EAS: Edge Application Server
ECS: Edge Configuration Server
EEC: Edge Enabler Client
EEL: Edge Enabler Layer
EES: Edge Enabler Server
KPI: Key Performance Indicator
UE: User Equipment

What is claimed is:

1. A method of media streaming, the method comprising:
  determining, by a user device, to determine a target edge application server (EAS) for a Fifth Generation Media Streaming (5GMS) streaming session with a 5GMS-aware application of the user device;
  receiving, by a media stream handler of the user device, Service Access Information from an edge data network;
  determining, by the media stream handler of the user device, whether the 5GMS streaming session meets eligibility criteria for requesting edge resources;
  in a determination that the 5GMS streaming session meets the eligibility criteria for requesting edge resources:
    sending, by the user device, a discovery request to identify one or more available EASs for the streaming session, wherein the discovery request comprises one or more discovery filters, the one or more discovery filters comprising one or more of: a service key performance indicator (KPI), a service area, a service availability schedule, or a service continuity scenario;
    receiving, by the user device, a discovery request response indicating the one or more available EASs that satisfy the discovery request;
    selecting, by the user device, the target EAS from among the one or more available EASs; and
    communicating, by the user device, a media stream during the streaming session with the target EAS.

2. The method of claim 1, wherein the one or more discovery filters comprises the service KPI.

3. The method of claim 1, wherein the one or more discovery filters comprises the service area.

4. The method of claim 1, wherein the one or more discovery filters comprises the service availability schedule.

5. The method of claim 1, wherein the one or more discovery filters comprises the service continuity scenario.

6. The method of claim 1,
  wherein the Service Access Information comprises an EAS discovery template comprising one or more of the service KPI, the service area, the service availability schedule, or the service continuity scenario.

7. The method of claim 6, further comprising:
  setting, by the user device, the one or more discovery filters to comprise one or more of the service KPI, the service area, the service availability schedule, or the service continuity scenario in response to the EAS discovery template of the Service Access Information comprising one or more of the service KPI, the service area, the service availability schedule, or the service continuity scenario.

* * * * *